(12) United States Patent
Zhou et al.

(10) Patent No.: US 11,746,651 B2
(45) Date of Patent: Sep. 5, 2023

(54) INTEGRATED MACHINE LEARNING FRAMEWORK FOR OPTIMIZING UNCONVENTIONAL RESOURCE DEVELOPMENT

(71) Applicant: ConocoPhillips Company, Houston, TX (US)

(72) Inventors: Hui Zhou, Houston, TX (US); Benjamin Lascaud, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 152 days.

(21) Appl. No.: 17/082,793

(22) Filed: Oct. 28, 2020

(65) Prior Publication Data

US 2021/0123343 A1  Apr. 29, 2021

Related U.S. Application Data

(60) Provisional application No. 62/926,788, filed on Oct. 28, 2019.

(51) Int. Cl.
*E21B 49/08* (2006.01)
*E21B 47/003* (2012.01)
(Continued)

(52) U.S. Cl.
CPC .............. *E21B 49/087* (2013.01); *E21B 7/04* (2013.01); *E21B 43/00* (2013.01); *E21B 47/003* (2020.05);
(Continued)

(58) Field of Classification Search
None
See application file for complete search history.

(56) References Cited

U.S. PATENT DOCUMENTS

| 10,364,662 B1 | 7/2019 | Basu et al. |
| 2014/0067353 A1 | 3/2014 | Shelley et al. |

(Continued)

FOREIGN PATENT DOCUMENTS

WO    2018132786 A1    7/2018

OTHER PUBLICATIONS

Hoeink et al., "Shale Discrimination with Machine Learning Methods," ARMA, 2017, 6pg. (Year: 2017).*
Mohaghegh, Shahab D., "Shale Analytics," WVU, 2017, 25pg. (Year: 2017).*
Tahmasebi et al., "Data mining and machine learning for identifying sweet spots in shale reservoirs," Elsevier, 2017, 13pg. (Year: 2017).*

(Continued)

*Primary Examiner* — Ryan D. Coyer
(74) *Attorney, Agent, or Firm* — Polsinelli PC

(57) ABSTRACT

Implementations described and claimed herein provide systems and methods for developing resources from an unconventional reservoir. In one implementation, raw reservoir data for the unconventional reservoir is obtained. The raw reservoir data includes geology data, completion data, development data, and production data. The raw reservoir data is transformed to transformed data. The raw reservoir data is transformed to the transformed data based on a transformation from a set of one or more raw variable to a set of one or more transformed variables. The set of one or more transformed variables is statistically uncorrelated. Resource development data is extracted from the transformed data. Performance analytics are generated for the unconventional reservoir using the resource development data. The performance analytics are generated through ensemble machine learning. The unconventional reservoir is developed based on the performance analytics.

20 Claims, 10 Drawing Sheets

(51) Int. Cl.

| | |
|---|---|
| *G01V 3/34* | (2006.01) |
| *G06N 20/00* | (2019.01) |
| *E21B 7/04* | (2006.01) |
| *E21B 43/00* | (2006.01) |
| *G06Q 10/04* | (2023.01) |
| *G06Q 10/0639* | (2023.01) |
| *G06Q 50/02* | (2012.01) |
| *G06F 17/18* | (2006.01) |

(52) U.S. Cl.
CPC .............. *G01V 3/34* (2013.01); *G06N 20/00* (2019.01); *G06Q 10/04* (2013.01); *G06Q 10/0639* (2013.01); *G06Q 50/02* (2013.01); *E21B 2200/22* (2020.05); *G06F 17/18* (2013.01)

(56) References Cited

U.S. PATENT DOCUMENTS

| | | | |
|---|---|---|---|
| 2015/0149142 A1 | 5/2015 | Li et al. | |
| 2017/0058669 A1 | 3/2017 | Lakings et al. | |
| 2020/0033495 A1* | 1/2020 | Tavares | G01V 99/005 |
| 2020/0065677 A1* | 2/2020 | Iriarte Lopez | G06N 3/084 |
| 2020/0386093 A1* | 12/2020 | Klenner | E21B 43/305 |
| 2021/0018655 A1* | 1/2021 | Sun | G01V 99/005 |
| 2021/0109252 A1* | 4/2021 | Li | G06N 5/003 |

OTHER PUBLICATIONS

Wang et al., "Applicability of deep neural networks on production forecasting in Bakken shale reservoirs," Elsevier, 2019, 14pg. (Year: 2019).*

Ye et al., "Feature Reduction via Generalized Uncorrelated Linear Discriminant Analysis," IEEE, 2006, 11 pg. (Year: 2006).*

Balaji et al., "Status of Data-Driven Methods and their Applications in Oil and Gas Industry," Society of Petroleum Engineers, 2018, 20pg. (Year: 2018).*

Ertekin, et al., "Artificial Intelligence Applications in Reservoir Engineering: A Status Check", Jul. 27, 2019, 22 Pages, retrieved on [Jan. 4, 2021]. Retrieved from the internet URL: https://www.mdpi.com/1996-1073/12/15/2897 entire document.

International Search Report and Written Opinion for International Application No. PCT/US2020/057661 dated Jan. 29, 2021, 10 pages.

Zhou, Hui et al., An Integrated Machine Learning Framework for Optimizing Unconventional Resources Development, Copyright 2019, Unconventional Resources Technology Conference (URTeC) DOI 10.15530/urtec-2019-319, Downloaded from http://onepetro.org/URTECONF/proceedings-pdf/19URTC/2-19URTC/D023S041R003/1138736/urtec-2019-319-ms.pdf/1 by ConocoPhillips Co user on Apr. 20, 2023, 9 pages.

* cited by examiner

INTEGRATED MACHINE LEARNING FRAMEWORK FOR OPTIMIZING UNCONVENTIONAL RESOURCE DEVELOPMENT

CROSS-REFERENCE TO RELATED APPLICATIONS

The present application claims benefit to U.S. Provisional Application No. 62/926,788, entitled "Integrated Machine Learning Framework for Optimizing Unconventional Resource Development" and filed Oct. 28, 2019, which is incorporated by reference in its entirety herein.

BACKGROUND

I. Technical Field

Aspects of the present disclosure relate generally to systems and methods for developing resources from unconventional reservoirs and more particularly to unconventional resource development using an integrated machine learning framework.

II. Related Art

Unconventional reservoirs, such as shale gas reservoirs, shale oil reservoirs, and/or the like, are generally complex both in terms of geology and development. More particularly, shales are highly heterogeneous due to nanoscale pore size and highly variable structures. Characterizing shale geology in terms of permeability and natural fractures remains a pervasive challenge. Exacerbating these challenges, performance of an unconventional well is strongly driven by development approaches in drilling, well placement, and completion, and the technology to reliably characterize and model hydraulic fractures is insufficient. The insufficiencies of such conventional technologies are especially apparent in the absence of detailed geology, stress field characterization, natural and hydraulic fracture delineation. The challenges only increase when modeling multiple wells with interference or communication between fractures. It is with these observations in mind, among others, that various aspects of the present disclosure were conceived and developed.

SUMMARY

Implementations described and claimed herein address the foregoing problems by providing systems and methods for developing resources from an unconventional reservoir. In one implementation, raw reservoir data for the unconventional reservoir is obtained. The raw reservoir data includes geology data, completion data, development data, and production data. The raw reservoir data is transformed to transformed data. The raw reservoir data is transformed to the transformed data based on a transformation from a set of one or more raw variable to a set of one or more transformed variables. The set of one or more transformed variables is statistically uncorrelated. Resource development data is extracted from the transformed data. Performance analytics are generated for the unconventional reservoir using the resource development data. The performance analytics are generated through ensemble machine learning. The unconventional reservoir is developed based on the performance analytics.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for developing resources from an unconventional reservoir. Generally, the presently disclosed technology transforms and integrates data in unconventional plays for machine learning, thereby enhancing predictability of machine learning and improving applicability to unconventional resources development. As the number of rigs running and wells producing in unconventional plays increases, so does the amount of data available regarding unconventional reservoirs, such as shale gas reservoirs, shale oil reservoirs, and/or the like. Through the flexible, scalable and integrated machine learning framework of the presently disclosed technology, various sources of data are leveraged to develop unconventional resources and in particular to provide performance analytics for an unconventional reservoir, including but not limited to: identification of a geology sweet spot; performance drivers; development strategies, such as well spacing, completion and production designs; and/or other analytics for optimizing development.

In one aspect, the presently disclosed technology provides a framework built on a big data warehouse and on-demand capability to efficiently visualize and analyze large volumes of heterogeneous reservoir data corresponding to one or more unconventional reservoirs. The framework transforms the reservoir data from disparate sources through transformations correlated with well performance. In connection with the transformation, well performance is characterized and well spatial and temporal relationships are analyzed in terms of well spacing, stacking and infill timing. The transformation may utilize a script, such as R, Python, and/or other scripting languages, in connection with transforming the reservoir data for interactive data processing, validation, and visualization. Once the reservoir data is transformed, machine learning techniques are applied to the transformed data to generate performance analytics for the unconventional reservoirs. This integration of machine learning with transformed reservoir data in a visual environment enables very intuitive and interactive testing, validation and interpretation, which provides valuable insight and confidence for development of the unconventional reservoir(s). Other advantages will be apparent from the present disclosure.

Figure 1:
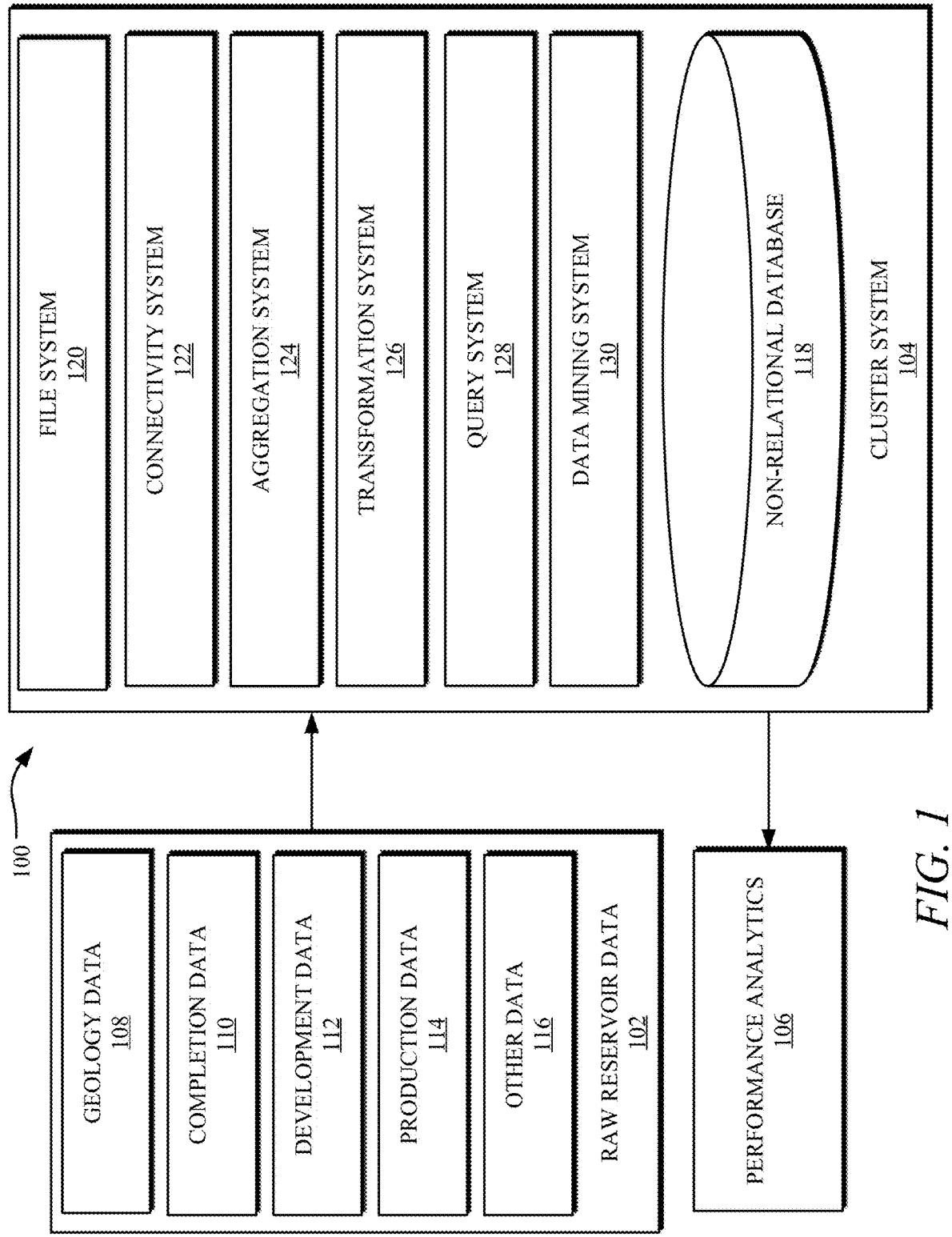
FIG. 1 illustrates an example resource development system.

To begin a detailed discussion of an example resource development system 100, reference is made to FIG. 1. As can be understood from FIG. 1, the resource development system 100 includes a cluster system 104 that generates performance analytics 106 for developing resources from one or more unconventional reservoirs based on raw reservoir data 102, which includes heterogeneous structured and unstructured data captured from disparate sources associated with the unconventional reservoir(s). Some of the raw reservoir data 102 may be captured directly, for example using one or more sensors deployed at the unconventional reservoir. Such data may include core, well log, fluid sampling, production data, and/or the like. On the other hand, some of the raw reservoir data 102, such as drilling and completion parameters, may be obtained from public sources in accordance with regulatory requirements. Additionally, the raw reservoir data 102 may include data input or otherwise obtained via an interface, at the direction of one or more computing units, and/or the like.

The raw reservoir data 102 is obtained at the distributed storage system 104, which generally provides the efficiency and scalability to handle large volumes of heterogeneous data and the machine learning techniques to generate the performance analytics 106. In one implementation, the raw reservoir data 102 includes geology data 108, completion data 110, development data 112, production data 114, and other data 116 associated with the unconventional reservoir(s).

In one implementation, the geology data 108 corresponds to characterization of the geology and petrophysical properties of the unconventional reservoir(s), as well as a mapping and summary of well properties. The geology data 108 may be captured from the unconventional reservoir(s) using one or more sensors deployed on site, obtained via user input, and/or other obtained or captured from various disparate sources. In one implementation, the geology data 108 includes raw log data, interpreted data, extrapolated data, and other data. The raw log data may include, without limitation, resistivity, Gamma ray, density, and/or neutron logs, as well as core data. The interpreted data may include, without limitation, interpreted lithologies and petrophysical properties based on logs and core analysis, such as water saturation, porosity, pay thickness, and/or the like. The extrapolated data includes data that is extrapolated or mapped based on the geology, petrophysical properties, geospatial correlations, basin migration theories, and/or the like corresponding to the unconventional reservoir(s). The inherent uncertainty of the interpreted data, as well as the uncertainty associated with the number of wells having log data being small relative to a total number of wells in the unconventional reservoir(s), is addressed by the cluster system 104 during transformation and/or machine learning.

The completion data 110 may include design parameters, operation parameters, and/or the like. The completion data 110 may be obtained in connection with operation of one or more wells, from publicly available sources, and/or the like. For example, some design parameters, such as total proppant, fluid, and well length, may be publicly available for shales. Other design parameters, including cluster spacing and number of clusters per stage, however, is typically unavailable via public sources. The operation parameters include these missing parameters, as well as detailed pressure, rate and proppant concentration profiles.

In one implementation, the development data 112 includes well surveys and development dates for one or more wells of the unconventional reservoir(s), as well as other well performance data. The development data 112 may be obtained in connection with operation of one or more wells, from publicly available sources, and/or the like. As discussed in more detail herein, the development data 112 may be transformed into development strategy data, such as well spacing, stacking and/or infill timing, which impacts well performance analysis. The performance analytics 106 generated using the transformed development data may include an interactive visualization of well performance for the unconventional reservoir(s).

The production data 114 similarly provides metrics for measuring well performance. The production data 114 may be obtained in connection with operation of one or more wells, from publicly available sources, and/or the like. For example, monthly rate data, often at lease level, may be obtained from public sources. Such information is typically imperfect or incomplete, however, so to reasonably represent well performance, the production data 114 is transformed for machine learning. The monthly rate data at lease level may be allocated to the well level based on periodical well testing reports, and dynamic pressure and rate date with time for each well are determined.

The raw reservoir data 102 provided to the cluster system 104 is stored in one or more non-relational databases 118. The data elements in the raw reservoir data 102 may be tagged with one or more relevancy values, which represent information contained in a data element. In one implementation, the relevancy values are assigned a priority. The relevancy values and the priorities may be assigned as the raw reservoir data 102 is provided or stored in the non-relational database 118.

The cluster system 104 is configured to parse, tag, and/or associate data elements for storage and analysis. In one implementation, the cluster system 104 includes a file system 120, a connectivity system 122, an aggregation system 124, a transformation system 126, a query system 128, and a data mining system 130 connected via a bus. However, additional or fewer systems or components are contemplated. Moreover, while each of the various modules and components are depicted in FIG. 1 as individual systems, infrastructures, components and/or applications, it is contemplated that all of such individual systems, infrastructures, components and/or applications may be combined in various ways within the framework, including being combined into a single or multiple applications.

In one implementation, an infrastructure of the cluster system 104 involves a Hadoop framework providing distributed processing of the raw reservoir data 102 and storage in the non-relational database 118. Additionally, the infrastructure may include a Spark framework for increasing speed of accessing data from the non-relational database 118. The Spark framework is a cluster-computing framework that provides an interface for programming clusters with implicit data parallelism and fault tolerance, as well as an in-memory database for quick and efficient data access. In one implementation, the cluster system 104 includes the Hadoop framework operating in conjunction with the Spark framework, such as the Spark framework installed on top of the Hadoop framework with data analytics applications of the Spark framework accessing data that was stored using the Hadoop framework.

The file system 120 is a distributed, scalable storage layer that is configured to store a large volume of the raw reservoir data 102, which may be structured data, unstructured data, and/or heterogeneous data. In one implementation, the file system 120 replicates and distributes blocks of data through cluster nodes, along with numerous other features and advantages. As such, the file system 120 generally manages the processing, storage, analysis, and retrieval of large volumes of data in the non-relational database 118. The file system 210 and the non-relational database 208 may be adapted for use in the Hadoop framework.

The file system 120 parses and loads the raw reservoir data 102 into the cluster system 104. The connectivity system 122 and/or the aggregation system 124 may extract and import the raw reservoir data 102 into the file system 120 for processing. In one implementation, the connectivity system 122 is configured to import data, such as the raw reservoir data 102, from disparate sources, including one or more relational databases, into the cluster system 104. The connectivity system 122 may be configured to permit a user to assign relevancy values and/or priorities to the data, as well as permit the user to specify a target relevant location for storage. The connectivity system 122 may be a connectivity tool adapted for use in the Hadoop framework. In one implementation, the aggregation system 124 is a framework for populating the cluster system 104 with data from the raw reservoir data 102 various data sources. For example, the aggregation system 124 may collect and integrate data from distributed data sources, such as log files, web servers, application servers, and user devices. The aggregation system 124 may be a tool for ingesting large amounts of distributed data, adapted for use in the Hadoop framework.

In one implementation, the transformation system 126 transforms and aggregates data for storage in the non-relational database 118 and subsequent machine learning. Stated differently, the transformation system 126 transforms raw data into tables or other aggregation for storage and analysis in the cluster system 104. The transformation system 126 may utilize a high-level data flow language or script for ingesting and transforming data. In some implementations, the transformations involve extracting text from formatted documents and/or creating and parsing data feeds.

In transforming the data, the query system 128 may leverage a clustering framework, such as Spark, adapted for use in the Hadoop environment. Spark involves a resilient distributed dataset (RDD), which is a read-only multiset of data items distributed over a cluster of machines, maintained in a fault-tolerant manner. The RDD of Spark provides a working set for distributed programs involving a restricted form of distributed shared memory. A primary application programming interface (API) may be deployed as an abstraction on top of the RDD of the query system 128 for communication among the data, scripts, user input, and script results. The query system 128 facilitates implementation of iterative algorithms, which visit datasets multiple times in a loop, and interactive data analysis involving repeated database querying of data. Such applications of the query system 128 experience a latency reduction of several orders of magnitude compared to other frameworks. The iterative algorithms of the query system 128 are among the class of training algorithms for machine learning systems.

To facilitate the interpretation of the complex heterogeneous data included in the raw reservoir data 102, the transformation system 126, which may include the query system 128, transforms the raw reservoir data 102 into transformed data having a more representative and meaningful form, optimized for machine learning. For example, the raw reservoir data 102 may be transformed into transformed data having uncorrelated variables, such that the transformed data is optimized for machine learning.

In one implementation, the completion data 110 is transformed by defining one or more raw completion variables and one or more transformed completion variables. For example, total proppant pounds, total fluid gallons, and total lateral length are publicly available and may be defined as the raw completion variables. In a simple transformation, the transformed variables are defined as: LL representing the total length; PFT as the proppant loading intensity; and PPG as the proppant concentration, as follows:

LL=TotalLateralLength(ft)
PFT=TotalProppant(lbs)/LL(ft)
PPG=TotalProppnat(lbs)/TotalFluid(gallon)

The transformed variables are statistically uncorrelated with each other while the raw completion variables are very strongly correlated (e.g., longer lateral length strongly correlates with larger total proppant and total fluid).

With respect to the development data 112, in one implementation, the raw data includes key dates (e.g., with respect to drilling, completion and production) and survey data for each well. The key dates and survey data may be used as one or more raw development variables. One or more transformed development variables may include spatial and temporal relationships between wells, which may be expressed using development parameters such as spacing, stacking and infill. Transforming the development data 112 into transformed data is not trivial, as the characterization of spacing, stacking and infill depends on an assumption on the horizontal and vertical ranges of well interference. As such, the assumption may be generated using a scripting language, such as R, Python, or the like. As described herein, such a scripting language is integrated into the cluster system 104, facilitating communication between script and raw data and script and user input (e.g., assumptions on well interference ranges), as well as script results (the transformed data) and the main data infrastructure of the cluster system 104.

Transformation of the production data 116 into transformed data may provide a more direct measure of well performance of the unconventional reservoir(s). As described herein, the production data 116 provided to the cluster system 104 is often incomplete (e.g., short production history, or only rate without pressure information) and/or imperfect (e.g., allocated data from lease report). Thus, transformation of the production data 116 into the transformed data addresses these issues to provide a reliable well performance metric.

An example of a useful production data transformer is based on long-term production forecast. More particularly, short-term production is dependent on production strategies, such as producing from casing or tubing, choke settings or facility sizing. In this example, the pressure data may be indispensable to characterize well performance but not available from public sources. On the other hand, long-term production is much less impacted by production strategies, and the production volumes alone can reasonably represent well performance. Various machine learning techniques, such as a neural network, a Markov Chain Monte Carlo (MCMC) based method, sweet spot, and performance driver identification and/or the like, may be utilized to transform short-term actual production data into long-term forecasted production data. Such a transformation introduces uncertainty in the same way as the interpreted geology properties introduce uncertainty, as discussed herein. However, as long as the forecast is done in a consistent and unbiased way for each well and the forecast assumptions follow widely accepted industry standards, the forecasted production is an excellent metric to compare well performance at least in a relative sense. Thus, the transformed data based on the production data 116 utilized to generate the performance analytics 106 achieves consistent and unbiased forecast, in addition to providing rigorous uncertainty quantification.

Based on an analysis of the data elements and user input associated with the transformed data, as described herein, the storage system 104 outputs the performance analytics 106 for the unconventional reservoir(s). In one implementation, the query system 128 processes data in the storage system 104 and outputs the performance analytics 106 using tools generating standard reporting format. For example, the query system 128 may utilize a data warehousing infrastructure built on top of Hadoop providing tools to enable ad hoc querying and data aggregation of large data sets. The query system 128 permits users to write a query in structured query language (SQL), NOSQL, or other query language, which may be converted as necessary for obtaining relevant data. In another implementation, the query system 128 outputs data in a format enabling further management, analysis, and/or merging with other data sources. In such cases, the query system 128 may utilize tools adapted for use in the Hadoop framework.

In one implementation, the data mining system 130 outputs the performance analytics 106 utilizing machine learning techniques. Machine learning generally refers to a machine learning through observing data that represents incomplete information about statistical happenings and generalizing such data to rules and/or algorithms that make predictions for future data, trends, and the like. Machine learning typically includes "classification" where machines learn to automatically recognize complex patterns and make intelligent predictions for a class. The data mining system 130 may use a machine learning library built on top of Hadoop that uses algorithms to perform clustering, regression testing, and statistic modeling. In one implementation, the data mining system 130 and/or the query system 128 outputs the performance analytics 106 using general and ad-hoc reporting and/or machine learning techniques.

More particularly, the data mining system 130 and/or the query system 128 employs a machine learning technique to further extract the most useful information and create predictive analytics based on the transformed data. One family of machine learning that may be utilized by the cluster system 104 includes ensemble learning, which uses multiple learning algorithms to obtain better predictive performance than could be obtained from any of the single constituent learning algorithms alone. For example, the ensemble learning may utilize blending, which is a form of stacking ensemble learning.

To begin a detailed discussion of example transformations of the raw reservoir data 102 into transformed data and generation of the performance analytics 106, reference is made to FIGS. 2-7. Each of FIGS. 2-7 provide non-limiting examples of transformed data and/or the performance analytics 106 for an unconventional reservoir.

Figure 2:
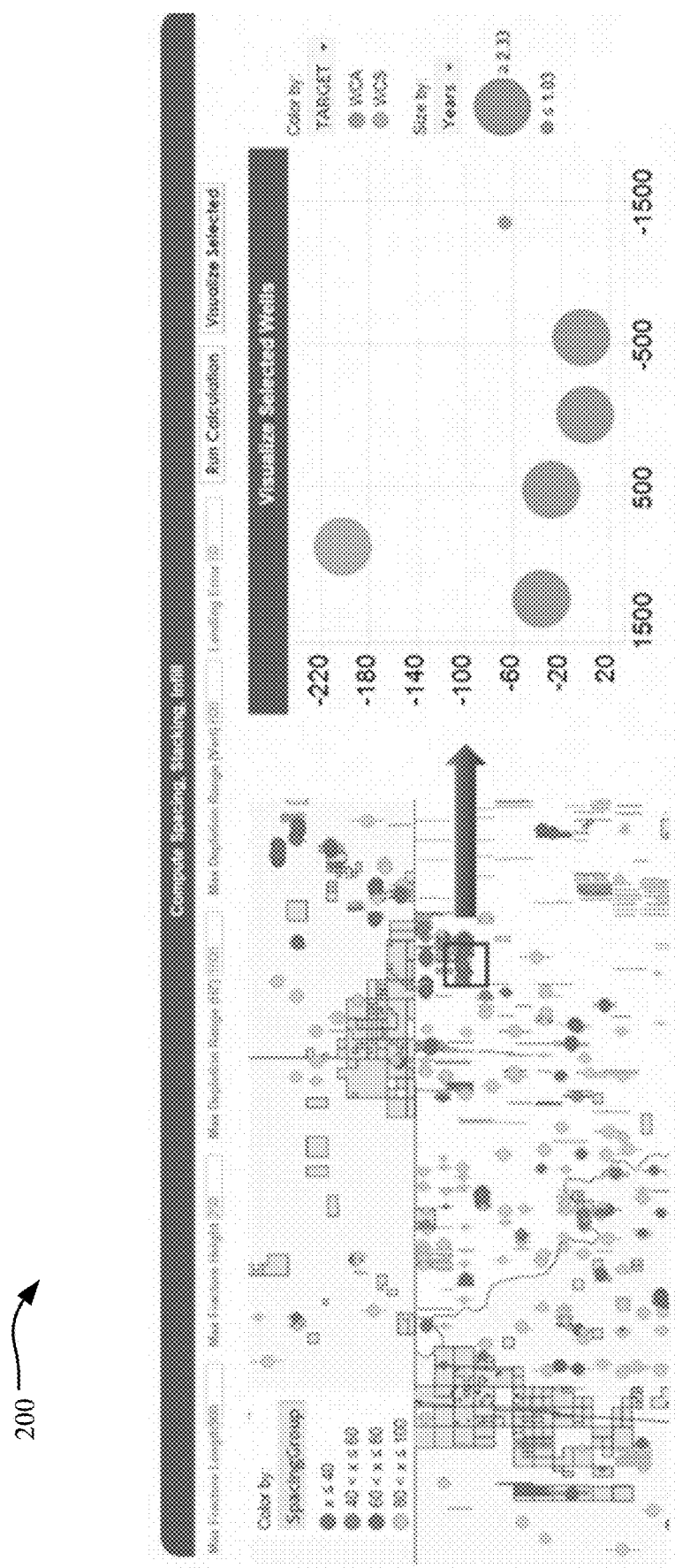
FIG. 2 shows example performance analytics for an unconventional reservoir, including visualizations of the wells characterized in terms of spacing, stacking, and infill status and timing.

Turning first to FIG. 2, the performance analytics 106 for an unconventional reservoir, including visualizations 200 of the wells characterized in terms of spacing, stacking, and infill status and timing, are shown. The visualizations 200 may include, for example, a map view, shown on the left, for discovering trends across the unconventional reservoir. The visualizations 200 may further include a gun barrel view of wells, shown on the right, (horizontal distance on x-axis, vertical distance on y-axis both in the unit of feet), permitting an understand the details of well placement in space and time. It will be appreciated, however, that the visualizations 200 may include other views or representations of the spacing, stacking, and infill status and timing of the wells, as generated based on the transformed data obtained from the development data 112.

Figure 3:
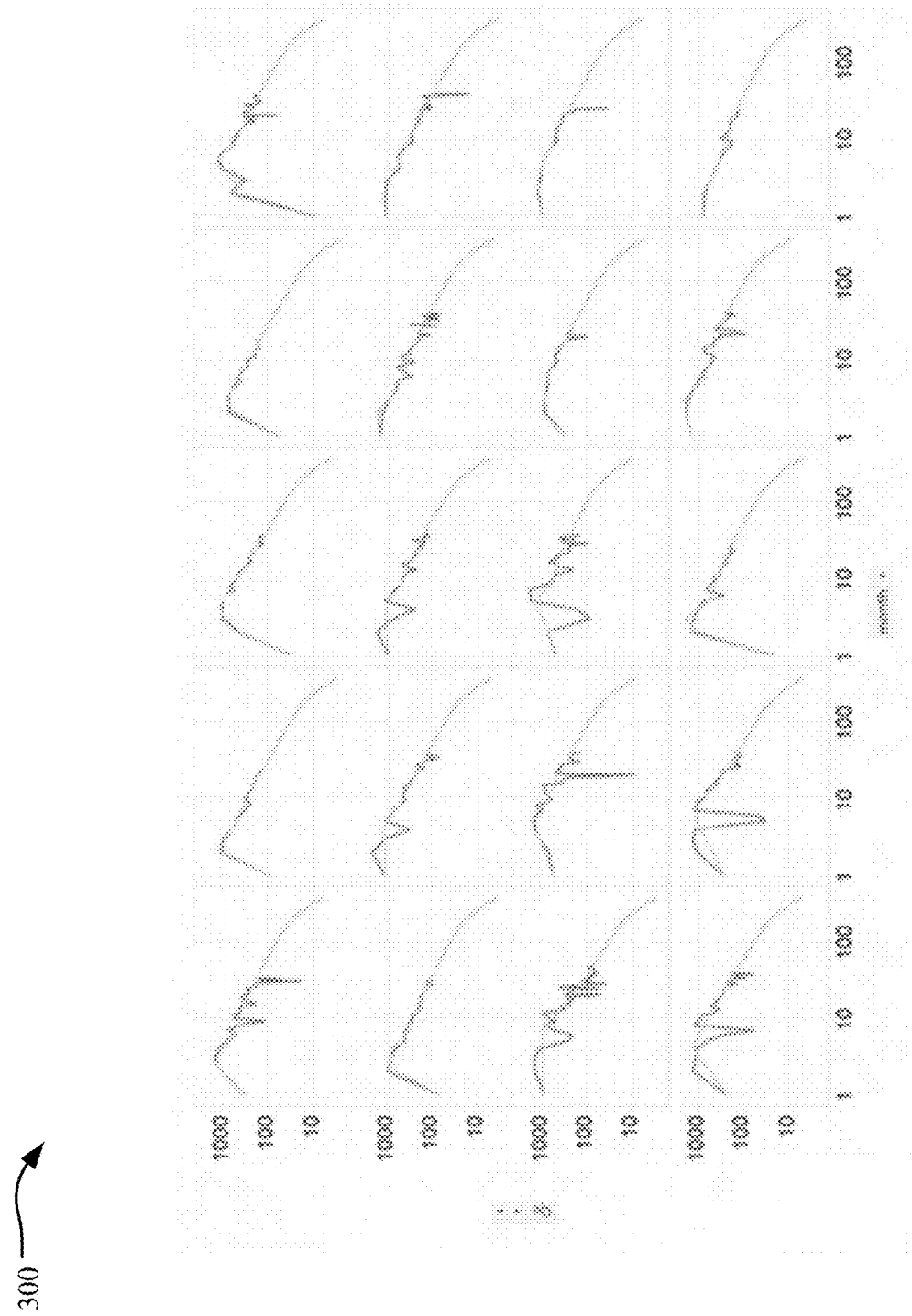
FIG. 3 depicts example performance analytics for an unconventional reservoir, including performance forecasts.

Referring to FIG. 3, the performance analytics 106 including a visualization 300 of performance forecasts are shown. For example, the visualization 300 of performance forecasts includes random examples in the unconventional reservoir where the oil rate is forecasted using the MCMC method based on public monthly data. The underlying forecast model may be, for example, Arp's decline curve. The forecast quality, even given the imperfect nature of public data, is demonstrated through a comparison of the actual oil rate compared to the forecasted oil rate, shown in the visualization 300 as dark gray lines, and light gray lines, respectively.

Figure 4:
FIG. 4 illustrates example performance analytics for an unconventional reservoir, including a visualization of model error on a geology map.

FIG. 4 illustrates the performance analytics 106, including a visualization 400 of model error on a geology map. As described herein, the integrated machine learning system provided by the cluster system 104 facilitates integration, visualization and interpretation of the machine learning results based on the transformed data. In the example visualization of 400, a model error on the geology map is shown together with other attributes. Using the visualization 400, it may be determined that there is much higher model error in a certain area of the unconventional reservoir. This problematic area may then be analyzed in more detail to understand why the area behaved differently from the main trend. For example, the bigger completion for this area does not result in performance uplift as in most other areas of the unconventional reservoir, thereby warranting more investigation on whether it is caused by specific operations or anything special in the underlying geology.

As such, development of the resources from the unconventional reservoir may be optimized based on the visualization 400 and/or other visualizations or corresponding performance analytics 106. Further optimization of the development of the resources in the unconventional reservoir, such as evaluation of new formation, optimization of well completion and spacing, and even PUD reserve booking in line with SPEE recommended reliable technology, and/or the like, may be executed based on the performance analytics 106.

Figure 5:
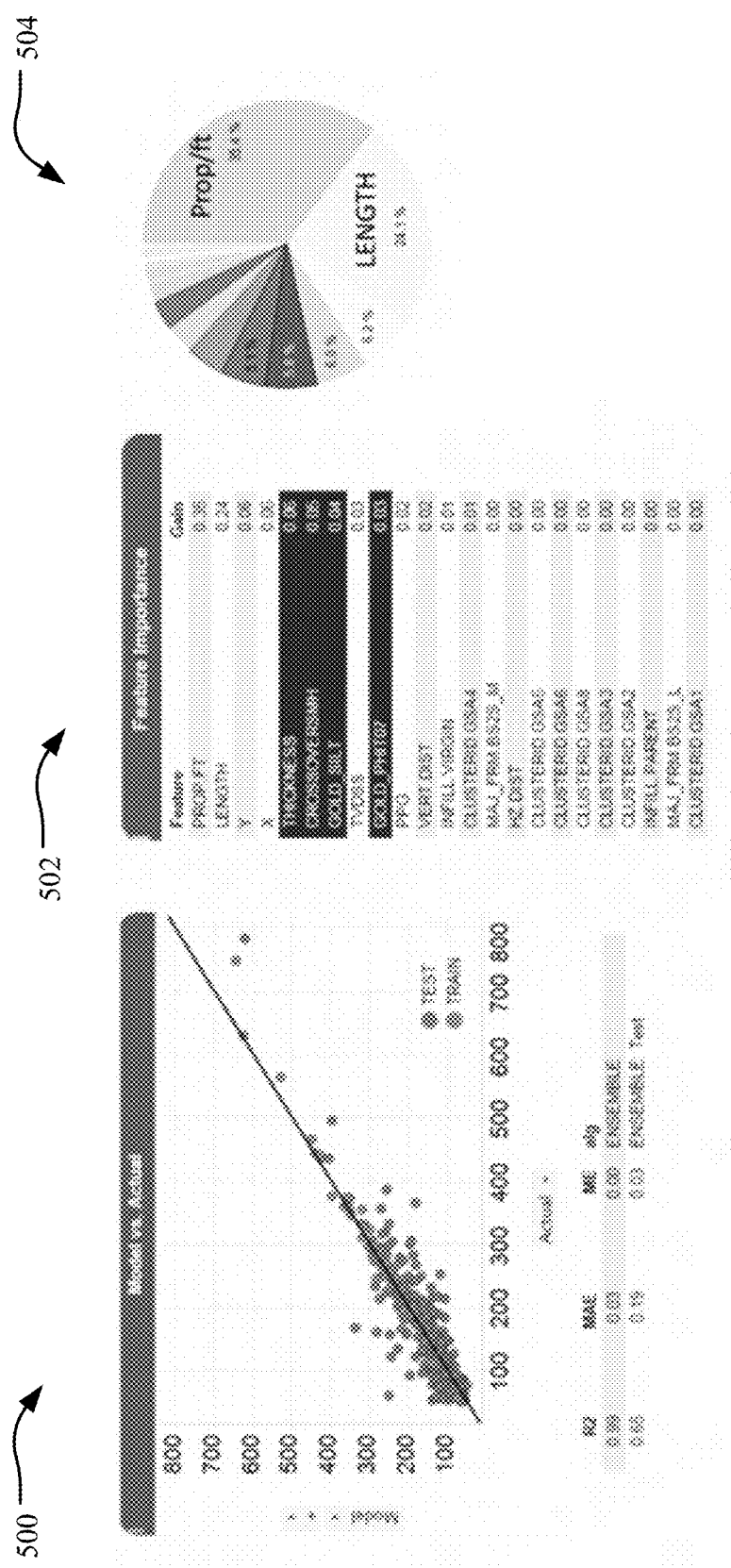
FIG. 5 illustrates example performance analytics for an unconventional reservoir, including formation evaluation.

FIG. 5 illustrates an example result for a formation evaluation, including a chart 500 of model versus actual, a table 502 of feature importance, and a chart 504 of percentages. The importance of features included in the table 502 shows that completion, especially total lateral length and proppant per ft, are the most important drivers for performance at the unconventional reservoir. The highlighted attributes in the table 502 are the most influential geology properties such as reservoir thickness, some calculated well-log metric, lithology and porosity.

Figure 6:
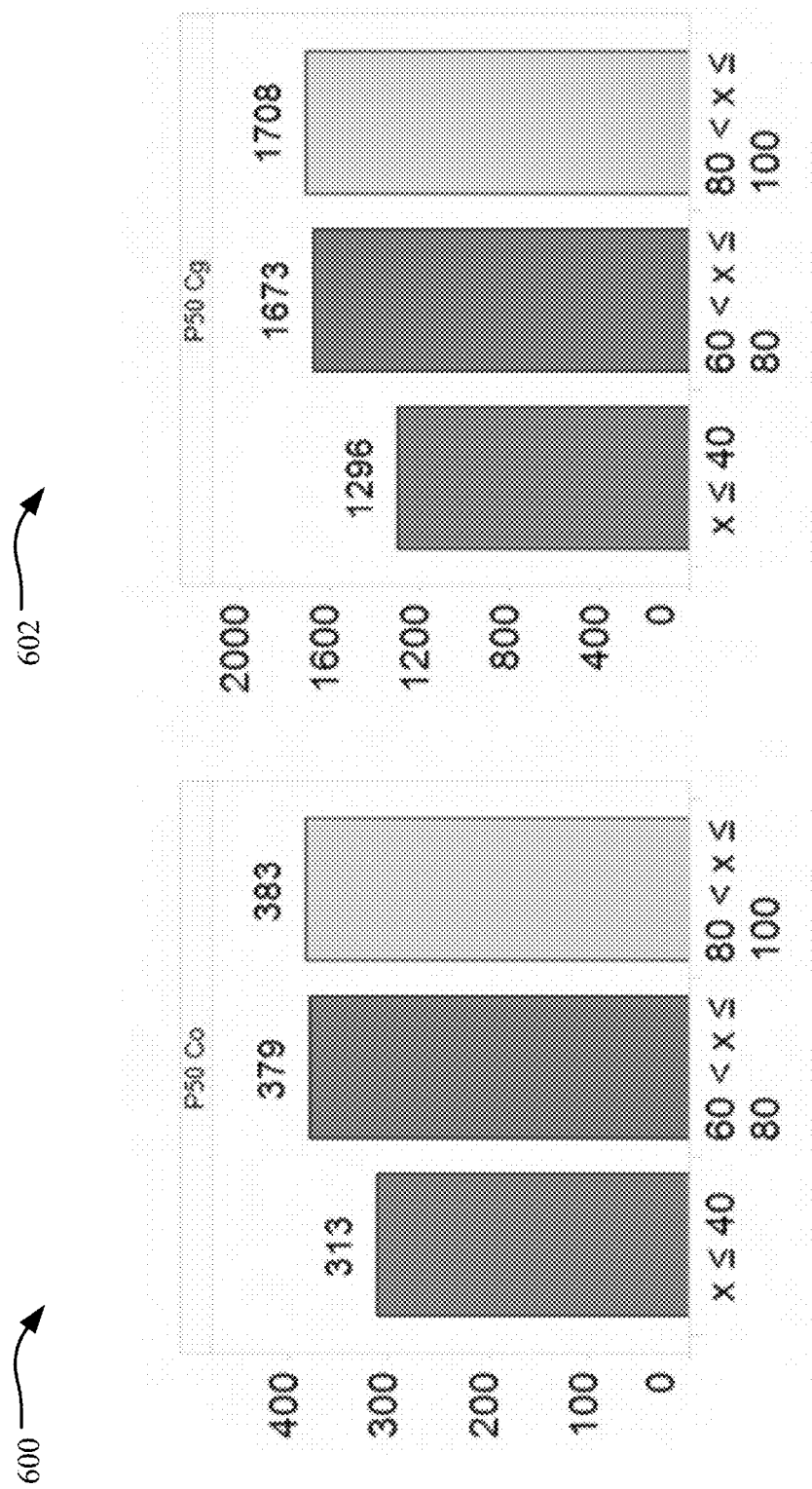
FIG. 6 shows example performance analytics for an unconventional reservoir, including spacing and stacking analysis.

Turning to FIG. 6, the performance analytics 106 include charts 600-602 showing spacing and stacking analysis. With a trained machine learning model, the cluster system 106 runs a prediction fixing all the variables other than a focus variable. As an example, the charts 600-602 quantifies the EUR for oil and gas at different spacing groups, which becomes the basis to optimize spacing and stacking.

Figure 7:
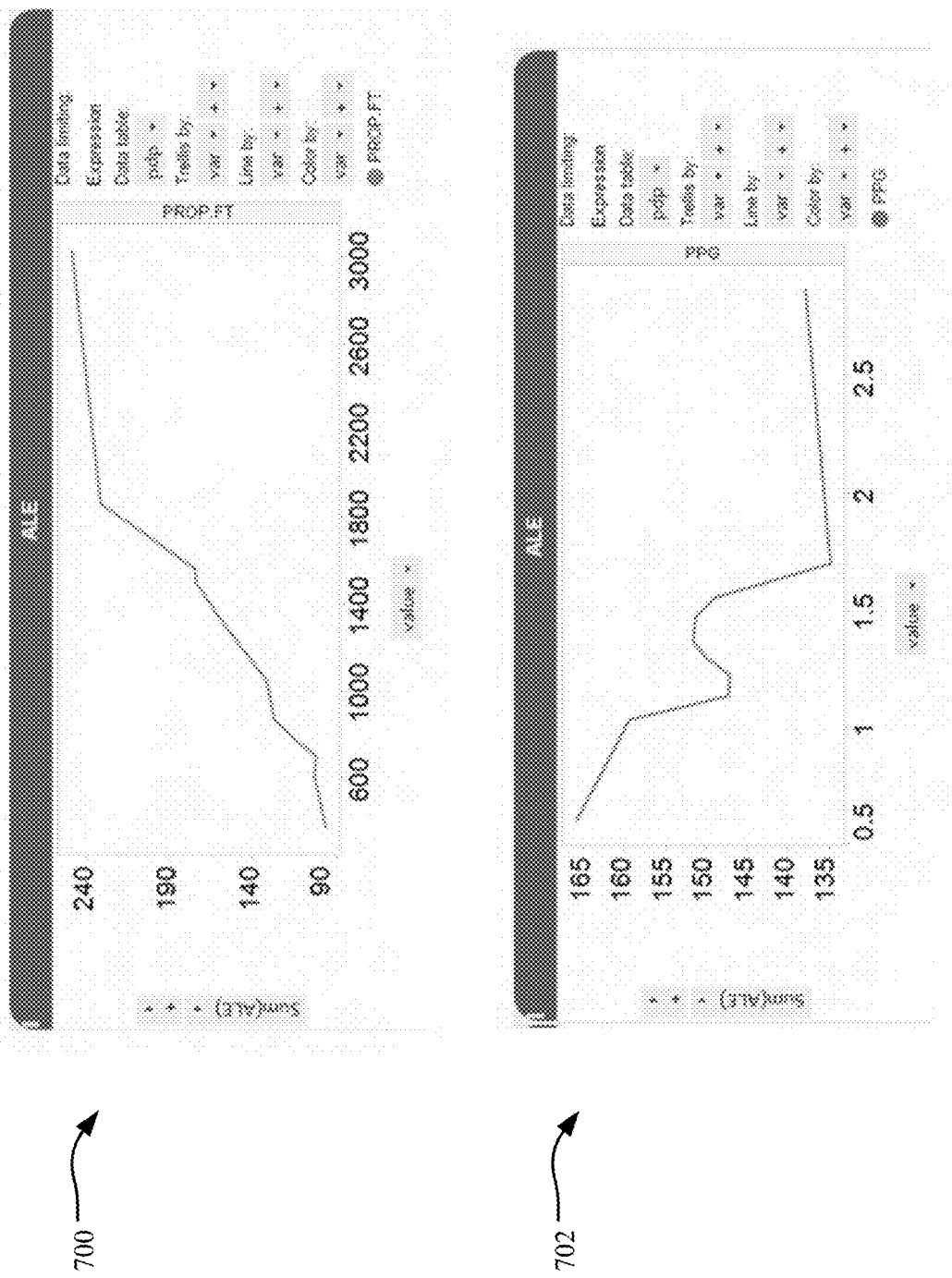
FIG. 7 shows example performance analytics for an unconventional reservoir, including a completion analysis.

Similarly, FIG. 7 shows charts 700-702 illustrating example completion analysis of the performance analytics 106. The chart 700 focuses on proppant per ft only and shows its impact on EUR in terms of accumulated local effects (ALE), which describes how a feature influences the prediction of a machine learning model on average. The chart 702 shows the impact of PPG on EUR in terms of ALE. The charts 700-702 demonstrate that proppant per ft is more significant than PPG. Moreover, the uplift effect of proppant loading intensity slows down around 2000 lbs./ft. Development of the unconventional reservoir may be optimized based on such completion analysis. For example, completion design may be optimized for the unconventional reservoir using the charts 700-702.

Generally, the cluster system 104 provides a flexible, scalable and integrated machine learning framework to leverage all sources of the raw reservoir data 102 and the latest machine learning techniques. The raw reservoir data 102 is transformed into transformed data to form the data infrastructure of the framework for studying unconventional reservoirs. The integrated framework of the cluster system 104 enables a rich collection of machine learning algorithms, including the powerful ensemble learning to be able to tackle different problems. The cluster system 104 is beneficial and insightful to visualize and interpret the machine learning results in an integrated system, such as in analyzing geology drivers, optimizing spacing, stacking and completion of an unconventional reservoir. The performance analytics 106 provide useful insights, based on which field development may be optimized.

Figure 8:
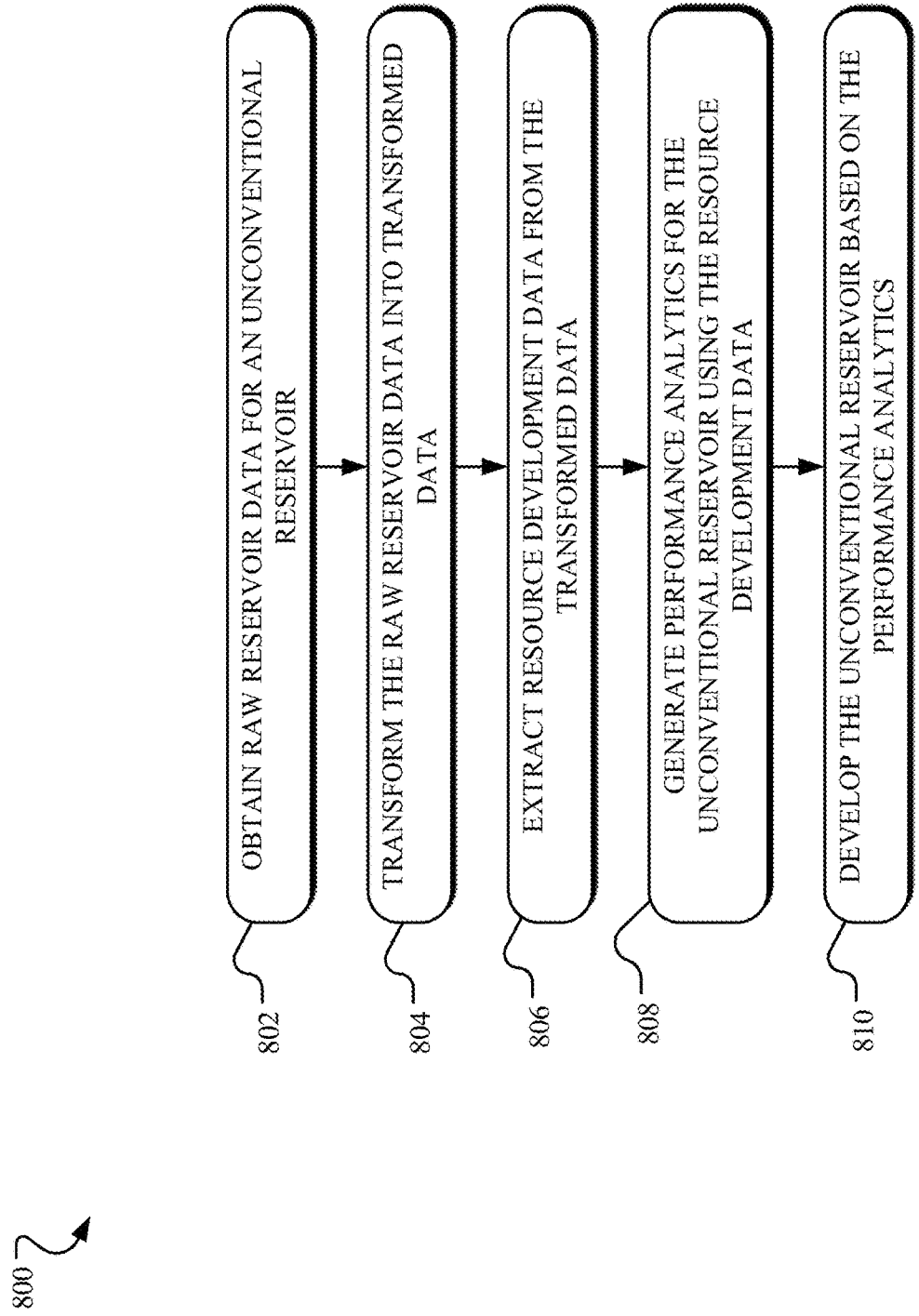
FIG. 8 illustrates example operations for developing resources from an unconventional reservoir.

Turning to FIG. 8, example operations 800 for developing resources from an unconventional reservoir are shown. In one implementation, an operation 802 obtains raw reservoir data for the unconventional reservoir. The unconventional reservoir may include a shale gas reservoir, a shale oil reservoir, and/or the like. The raw reservoir data includes geology data, completion data, development data, production data, and/or the like. The geology data includes, without limitation, raw log data, petrophysical property data, core analysis data, geospatial correlation data, basin migration data, and/or other data corresponding to the structure and physical features of the unconventional reservoir. The completion data includes, without limitation, total proppant data, fluid data, well length data, cluster spacing data, clusters per stage data, pressure data, rate data, proppant concentration profile data, and/or other data corresponding to completion design and execution of a development system for developing resources from the unconventional reservoir. The development data includes well survey data, development date data, and/or other data corresponding to developing the unconventional reservoir. The production data includes monthly rate data, and/or other data corresponding to production of resources based on development of the unconventional reservoir. Other heterogeneous data obtained from disparate sources and corresponding to development of the unconventional reservoir may also be obtained in the operation 802.

In one implementation, an operation 804 transforms the raw reservoir data to transformed data. The operation 804 transforms the raw reservoir data to the transformed data based on a transformation from a set of one or more raw variable to a set of one or more transformed variables. The set of one or more transformed variables is statistically uncorrelated. For example, the completion data may be transformed in the operation 804 by defining the set of one or more raw variables as total proppant pounds, total fluid gallons, and total lateral length and the set of one or more transformed variables as total length, proppant loading intensity, and proppant concentration. The operation 804 may transform the development data by defining key dates and surveys for each well as the set of one or more raw variables. An assumption of horizontal and vertical ranges of well interference for the unconventional reservoir is generated using the development data. Spatial and temporal relationships between wells in the unconventional reservoir is expressed using spacing, stacking, infill status, and timing as the set of one or more transformed variables based on the assumption. The production data is transformed in the operation 804 by defining the set of one or more raw variables as short-term actual production and the set of one or more transformed variables as long-term production forecasted production. The geology data may be transformed by defining the set of one or more transformed variables as one or more of reservoir thickness, well log metric, lithology, and porosity. An operation 806 extracts resource development data from the transformed data. The resource development data may be extracted through machine learning techniques based on relevancy, priority, and other attributes of the transformed data.

An operation 808 generates performance analytics for the unconventional reservoir using the resource development data. In one implementation, the performance analytics generated through ensemble machine learning. However, other types of machine learning techniques may be utilized to generate the performance analytics. The performance analytics may include, without limitation: new formation evaluation, optimization of well completion and spacing, proved undeveloped reserves booking; model error; geology mapping; and/or the like.

In one implementation, an operation 810 develops the unconventional reservoir based on the performance analytics. Developing the unconventional reservoir may include extracting the resources from the unconventional reservoir based on the performance analytics, generating a visualization of the performance analytics, and/or the like. The resources may be extracted using a development system, and the visualization may be presented using a display or other presentation system.

Figure 9:
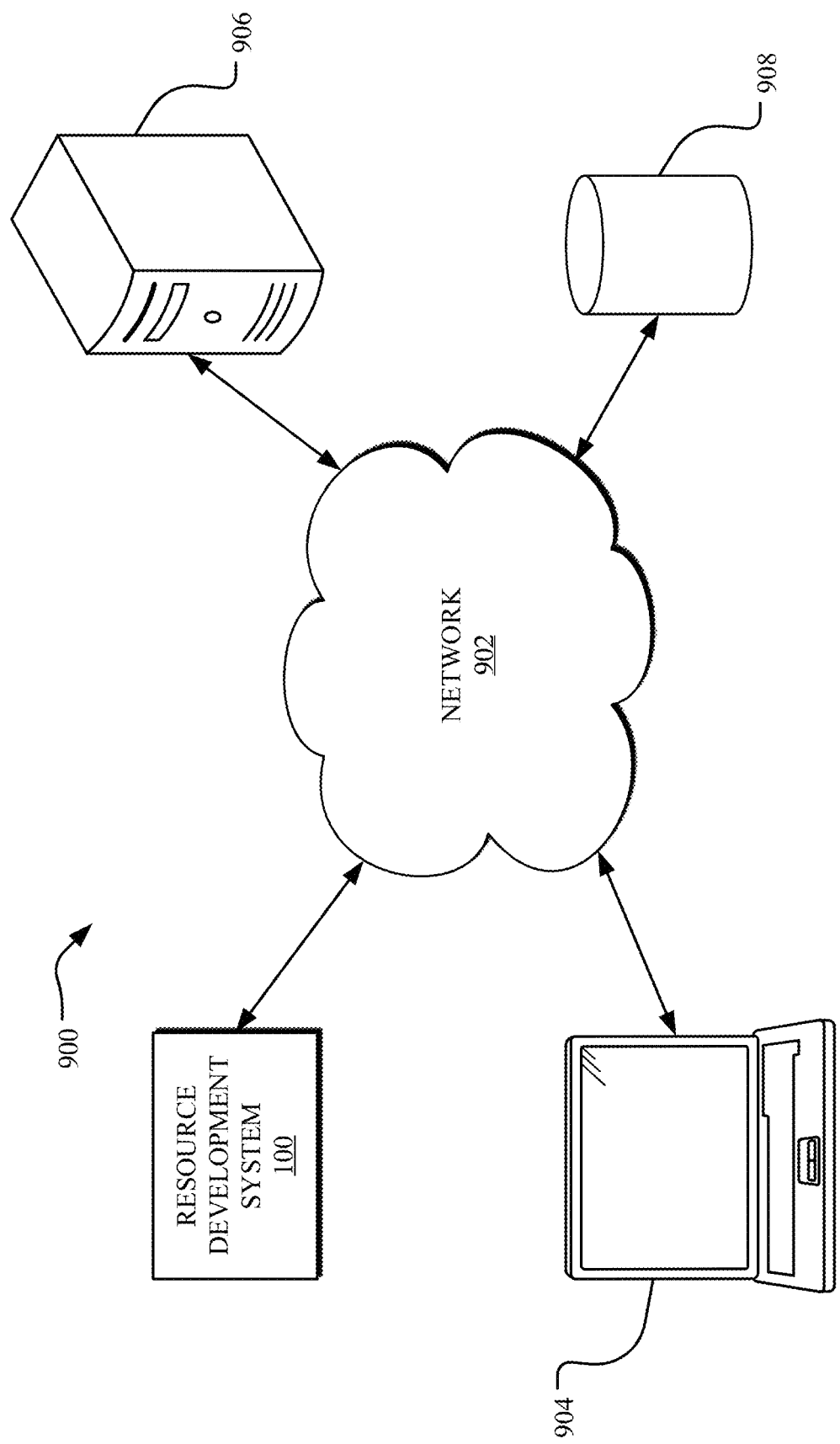
FIG. 9 shows an example network environment that may implement various systems and methods discussed herein.

FIG. 9 illustrates an example network environment 900 for implementing the various systems and methods, as described herein. As depicted in FIG. 9, a network 902 is used by one or more computing or data storage devices for implementing the systems and methods for developing resources from an unconventional reservoir. In one implementation, various components of the resource development system 100, one or more user devices 904, one or more databases 908, and/or other network components or computing devices described herein are communicatively connected to the network 902. Examples of the user devices 904 include a terminal, personal computer, a smart-phone, a tablet, a mobile computer, a workstation, and/or the like.

A server 906 hosts the system. In one implementation, the server 906 also hosts a website or an application that users may visit to access the system 100. The server 906 may be one single server, a plurality of servers with each such server being a physical server or a virtual machine, or a collection of both physical servers and virtual machines. In another implementation, a cloud hosts one or more components of the system. The system 100, the user devices 904, the server 906, and other resources connected to the network 902 may access one or more additional servers for access to one or more websites, applications, web services interfaces, etc. that are used for resource development. In one implementation, the server 906 also hosts a search engine that the system uses for accessing and modifying information, including without limitation, the raw reservoir data 102, the transformed data, the resource development data, and/or the performance analytics 106.

Figure 10:
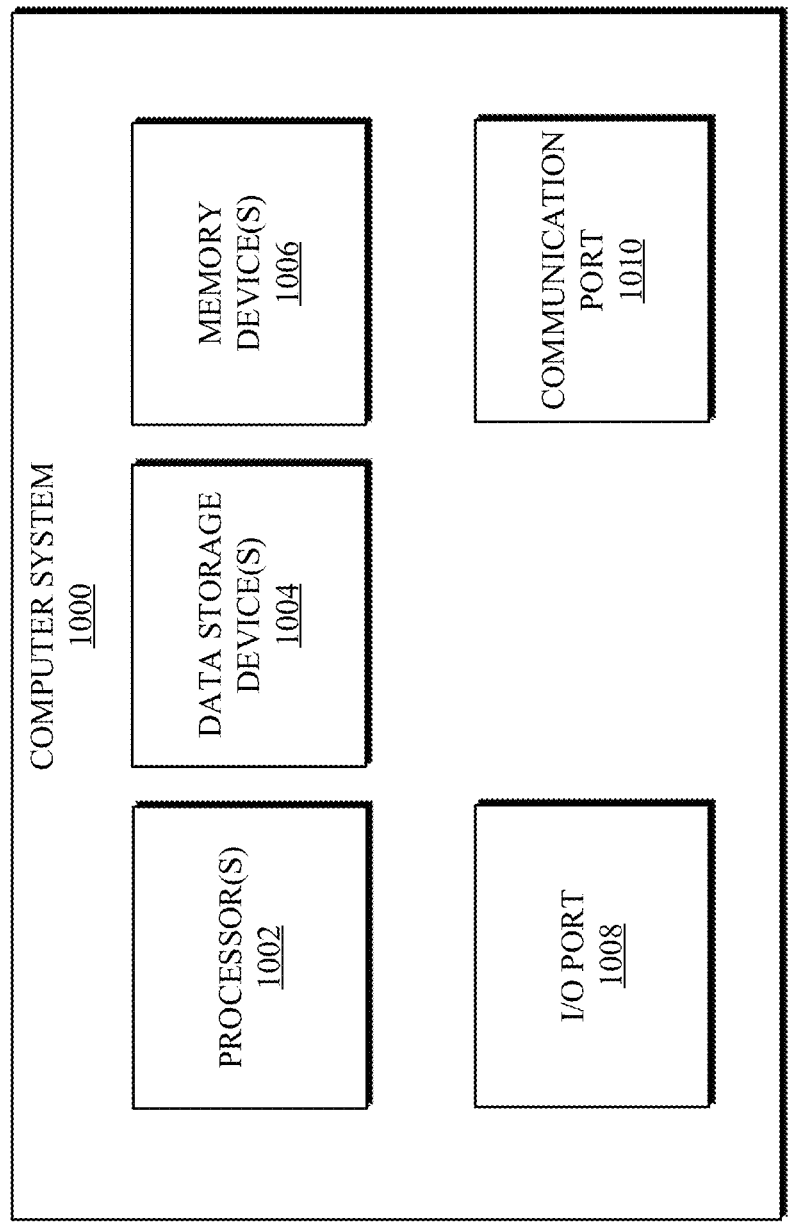
FIG. 10 depicts an example computing system that may implement various systems and methods discussed herein.

Referring to FIG. 10, a detailed description of an example computing system 1000 having one or more computing units that may implement various systems and methods discussed herein is provided. The computing system 1000 may be applicable to the reservoir development system 100, various systems or aspects of the cluster system 104, the server 906, the user devices 904, and other computing or network devices. It will be appreciated that specific implementations of these devices may be of differing possible specific computing architectures not all of which are specifically discussed herein but will be understood by those of ordinary skill in the art.

The computer system 1000 may be a computing system is capable of executing a computer program product to execute a computer process. Data and program files may be input to the computer system 1000, which reads the files and executes the programs therein. Some of the elements of the computer system 1000 are shown in FIG. 10, including one or more hardware processors 1002, one or more data storage devices 1004, one or more memory devices 1008, and/or one or more ports 1008-1010. Additionally, other elements that will be recognized by those skilled in the art may be included in the computing system 1000 but are not explicitly depicted in FIG. 10 or discussed further herein. Various elements of the computer system 1000 may communicate with one another by way of one or more communication buses, point-to-point communication paths, or other communication means not explicitly depicted in FIG. 10.

The processor 1002 may include, for example, a central processing unit (CPU), a microprocessor, a microcontroller, a digital signal processor (DSP), and/or one or more internal levels of cache. There may be one or more processors 1002, such that the processor 1002 comprises a single central-processing unit, or a plurality of processing units capable of executing instructions and performing operations in parallel with each other, commonly referred to as a parallel processing environment.

The computer system 1000 may be a conventional computer, a distributed computer, or any other type of computer, such as one or more external computers made available via a cloud computing architecture. The presently described technology is optionally implemented in software stored on the data stored device(s) 1004, stored on the memory device(s) 1006, and/or communicated via one or more of the ports 1008-1010, thereby transforming the computer system 1000 in FIG. 10 to a special purpose machine for implementing the operations described herein. Examples of the computer system 1000 include personal computers, terminals, workstations, mobile phones, tablets, laptops, personal computers, multimedia consoles, gaming consoles, set top boxes, and the like.

The one or more data storage devices 1004 may include any non-volatile data storage device capable of storing data generated or employed within the computing system 1000, such as computer executable instructions for performing a computer process, which may include instructions of both application programs and an operating system (OS) that manages the various components of the computing system 1000. The data storage devices 1004 may include, without limitation, magnetic disk drives, optical disk drives, solid state drives (SSDs), flash drives, and the like. The data storage devices 1004 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1006 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1004 and/or the memory devices 1006, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1000 includes one or more ports, such as an input/output (I/O) port 1008 and a communication port 1010, for communicating with other computing, network, or vehicle devices. It will be appreciated that the ports 1008-1010 may be combined or separate and that more or fewer ports may be included in the computer system 1000.

The I/O port 1008 may be connected to an I/O device, or other device, by which information is input to or output from the computing system 1000. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1000 via the I/O port 1008. Similarly, the output devices may convert electrical signals received from computing system 1000 via the I/O port 1008 into signals that may be sensed as output by a human, such as sound, light, and/or touch. The input device may be an alphanumeric input device, including alphanumeric and other keys for communicating information and/or command selections to the processor 1002 via the I/O port 1008. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1000 via the I/O port 1008. For example, an electrical signal generated within the computing system 1000 may be converted to another type of signal, and/or vice-versa. In one implementation, the environment transducer devices sense characteristics or aspects of an environment local to or remote from the computing device 1000, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1000, such as, physical movement of some object (e.g., a mechanical actuator), heating or cooling of a substance, adding a chemical substance, and/or the like.

In one implementation, a communication port 1010 is connected to a network by way of which the computer system 1000 may receive network data useful in executing the methods and systems set out herein as well as transmitting information and network configuration changes determined thereby. Stated differently, the communication port 1010 connects the computer system 1000 to one or more communication interface devices configured to transmit and/or receive information between the computing system 1000 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1010 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1010 may communicate with an antenna or other link for electromagnetic signal transmission and/or reception.

In an example implementation, the raw reservoir data 102, the performance analytics 106, transformed data, resource development data, software and other modules and services may be embodied by instructions stored on the data storage devices 1004 and/or the memory devices 1006 and executed by the processor 1002.

The system set forth in FIG. 10 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for developing resources from an unconventional reservoir, the method comprising:
obtaining raw reservoir data for the unconventional reservoir, the raw reservoir data being input data including geology data, completion data, development data, and production data, the completion data includes at least one of total proppant data, fluid data, well length data, cluster spacing data, clusters per stage data, pressure data, rate data, or proppant concentration profile data;
transforming the raw reservoir data into transformed data, the raw reservoir data being transformed into the transformed data based on a transformation from a set of one or more raw variables into a set of one or more transformed variables, the set of one or more transformed variables being statistically uncorrelated;
extracting resource development data from the transformed data;
generating performance analytics for the unconventional reservoir using the resource development data, the performance analytics generated through ensemble machine learning; and
developing the unconventional reservoir based on the performance analytics.

2. The method of claim 1, wherein the unconventional reservoir includes at least one of a shale gas reservoir or a shale oil reservoir.

3. The method of claim 1, wherein developing the unconventional reservoir includes extracting the resources from the unconventional reservoir based on the performance analytics.

4. The method of claim 1, wherein developing the unconventional reservoir includes generating a visualization of the performance analytics, the visualization presented using a display.

5. The method of claim 1, wherein the geology data includes one or more of raw log data, petrophysical property data, core analysis data, geospatial correlation data, and basin migration data.

6. The method of claim 1, wherein the development data includes one or more of well survey data and development date data.

7. The method of claim 1, wherein the production data includes monthly rate data.

8. The method of claim 1, wherein the completion data is transformed by defining the set of one or more raw variables as total proppant pounds, total fluid gallons, and total lateral length and defining the set of one or more transformed variables as total length, proppant loading intensity, and proppant concentration.

9. The method of claim 1, wherein the development data is transformed by:
defining key dates and surveys for each well of the unconventional reservoir as the set of one or more raw variables;
generating an assumption of horizontal and vertical ranges of well interference for the unconventional reservoir using the development data; and
expressing spatial and temporal relationships between wells in the unconventional reservoir using spacing, stacking, infill status, and timing as the set of one or more transformed variables based on the assumption.

10. The method of claim 1, wherein the production data is transformed by defining the set of one or more raw variables as short-term actual production and defining the set of one or more transformed variables as long-term production forecasted production.

11. The method of claim 1, wherein the geology data is transformed by defining the set of one or more transformed variables as one or more of reservoir thickness, well log metric, lithology, and porosity.

12. The method of claim 1, wherein the performance analytics include one or more of: new formation evaluation, optimization of well completion and spacing, proved undeveloped reserves booking; model error; and geology mapping.

13. One or more tangible non-transitory computer-readable storage media storing computer-executable instructions for performing a computer process on a computing system, the computer process comprising:
obtaining raw reservoir data as input data for an unconventional reservoir, the raw reservoir data including geology data, completion data, development data, and production data;
transforming the raw reservoir data into transformed data, the raw reservoir data being transformed into the transformed data based on a transformation from a set of one or more raw variables into a set of one or more transformed variables, the completion data is transformed by:
defining the set of one or more raw variables as total proppant pounds, total fluid gallons, and total lateral length; and
defining the set of one or more transformed variables as total length, proppant loading intensity, and proppant concentration;
extracting resource development data from the transformed data; and
generating performance analytics for the unconventional reservoir using the resource development data, the performance analytics generated through ensemble machine learning, the unconventional reservoir being developed based on the performance analytics.

14. The one or more tangible non-transitory computer-readable storage media of claim 13, wherein the development data is transformed by:
defining key dates and surveys for each well of the unconventional reservoir as the set of one or more raw variables;
generating an assumption of horizontal and vertical ranges of well interference for the unconventional reservoir using the development data; and
expressing spatial and temporal relationships between wells in the unconventional reservoir using spacing, stacking, infill status, and timing as the set of one or more transformed variables based on the assumption.

15. The one or more tangible non-transitory computer-readable storage media of claim 13, wherein the production data is transformed by defining the set of one or more raw variables as short-term actual production and defining the set of one or more transformed variables as long-term production forecasted production.

16. The one or more tangible non-transitory computer-readable storage media of claim 13, wherein the geology data is transformed by defining the set of one or more transformed variables as one or more of reservoir thickness, well log metric, lithology, and porosity.

17. A system for developing resources from an unconventional reservoir, the system comprising:
a transformation system transforming raw reservoir data for the unconventional reservoir into transformed data based on a transformation from a set of one or more raw variables into a set of one or more transformed variables, the set of one or more transformed variables being statistically uncorrelated, and transforming the raw reservoir data includes:
defining key dates and surveys for wells of the unconventional reservoir as the set of one or more raw variables;
generating an assumption of horizontal and vertical ranges of well interference for the unconventional reservoir using development data of the raw reservoir data; and
expressing spatial and temporal relationships between wells in the unconventional reservoir using spacing, stacking, infill status, and timing as the set of one or more transformed variables based on the assumption; and
a cluster system storing the transformed data in a non-relational database, the cluster system extracting resource development data from the transformed data and generating performance analytics for the unconventional reservoir using the resource development data, the performance analytics generated through ensemble machine learning.

18. The system of claim 17, wherein the performance analytics include one or more of: new formation evaluation, optimization of well completion and spacing, proved undeveloped reserves booking; model error; and geology mapping.

19. The method of claim 1, wherein the set of one or more raw variables includes a geology data variable, a completion data variable, a development data variable, and a production data variable.

20. The one or more tangible non-transitory computer-readable storage media of claim 13, wherein the set of one or more raw variables are correlated and the set of one or more transformed variables are uncorrelated.

\* \* \* \* \*